United States Patent
McCabe

[11] Patent Number: 5,964,371
[45] Date of Patent: Oct. 12, 1999

[54] DISPOSABLE RESERVOIR FOR EVAPORATIVE COOLERS

[76] Inventor: Ronald Paul McCabe, 737 E. Tuckey La., Phoenix, Ariz. 85014

[21] Appl. No.: 09/022,461

[22] Filed: Feb. 12, 1998

[51] Int. Cl.[6] ............... B65D 1/34; B65D 1/40
[52] U.S. Cl. ............... 220/571; 62/304; 206/557; 220/4.12; 220/4.21; 261/29
[58] Field of Search .............. 206/557, 561; 62/259.4, 294, 304, 285, 291, DIG. 20, DIG. 11; 220/571, 4.12, 4.13, 4.21; 261/29, DIG. 15, DIG. 43, DIG. 44, DIG. 46; 126/113

[56] References Cited

U.S. PATENT DOCUMENTS

| | | | |
|---|---|---|---|
| 1,615,689 | 1/1927 | Fackler | 126/113 |
| 3,438,507 | 4/1969 | Kreuger | 229/129 X |
| 3,700,096 | 10/1972 | Reifers | 229/162 |
| 3,774,588 | 11/1973 | Yeagle | 126/113 |
| 4,029,822 | 6/1977 | Comer | 229/129 X |
| 4,154,355 | 5/1979 | Shackelford | 220/4.21 |
| 4,369,148 | 1/1983 | Hawkins . | |
| 4,428,890 | 1/1984 | Harrell | 261/29 |
| 4,562,016 | 12/1985 | Colliver | 62/304 X |
| 4,657,709 | 4/1987 | Goettl . | |
| 4,687,604 | 8/1987 | Goettl . | |
| 4,834,243 | 5/1989 | Langenbeck | 206/557 |
| 4,974,421 | 12/1990 | Kim | 62/285 X |
| 4,977,755 | 12/1990 | Tulley . | |
| 5,392,944 | 2/1995 | Jennings . | |
| 5,606,868 | 3/1997 | Calvert | 62/304 X |

FOREIGN PATENT DOCUMENTS

| | | | |
|---|---|---|---|
| 944684 | 4/1974 | Canada | 126/113 |
| 1092506 | 12/1980 | Canada | 126/DIG. 15 |

OTHER PUBLICATIONS

PPA# 60,040,108, 1997, Rees/McCabe.
Maintenance and troubleshooting guide, 1991 Dial manufacturing, Inc. pp. 1–5.

*Primary Examiner*—Allan N. Shoap
*Assistant Examiner*—Joe Merek

[57] ABSTRACT

A disposable, performed reservoir which will fit within the existing resevoir of an evaporative cooler. It has molded in air access channels in its sides, edges and bottom. These air access channels permit the differential in air pressure between the inside and out side of the cooler cabinet, when the cooler is in operation, draw a flow of air in, under and between the dispoable reservoir and the cooler's integral resevoir thereby retarding all forms of corrosion. The disposable reservoir is formed of a thin semi-flexible, impermeable material which forms a tray-like article that provides for a convenient means of containing distilled salts and minerals typically realized inside of an evaporative cooler during operation. The disposable reservoir facilities the cleaning and repair of the cooler's permanent reservoir and greatly reduces the opportunity for corrosion to the cooler.

4 Claims, 8 Drawing Sheets

DISPOSABLE RESERVOIR FOR EVAPORATIVE COOLERS

CROSS-REFERENCE TO RELATED APPLICATION

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF INVENTION

This invention pertains to evaporative coolers, particularly to maintaining and repairing the water reservoir of said coolers.

Evaporative coolers are widely employed to cool buildings in areas of the country where the humidity is sufficiently low. These coolers must be cleaned periodically and parts repaired or replaced.

Water is held in the sheet metal base of a cooler, which forms a tray with raised sides to create the reservoir. Water is pumped to the tops of porous pads through which air is drawn and cooled by evaporation. Water not evaporated drains back to the reservoir. A float-activated valve maintains the water level. Residue from contaminates; salts and distilled minerals from the water are collected in the reservoir and must be periodically cleaned out. Contaminates eventually permeate into the plating or galvanization of the metal of the reservoir and corrosion results.

Heretofore, the reservoir would be evacuated, dried, scrapped or brushed, and debris removed. Special attention would be given to badly corroded spots and leaks would be repaired. Once the reservoir is properly prepared, it would then be coated with a submarine cooler emulsion. In extreme cases, said emulsion may not be sufficient to repair said leaks. Numerous disadvantages exist with the use of said emulsion. This is a time-consuming, dirty, toxic task. The clean up after this process is as undesirable as the task itself. These coatings generally require considerable drying time before the cooler can be re-assembled and placed into service. The major disadvantage with this repair method is that where adhesion to the corroded surface of said cooler's reservoir has not been perfect, water leaches under the coating and reaches areas where there is no access for free oxygen and anaerobic corrosion results.

Various prior inventions in addition to said submarine emulsions have been directed to the alleviation of this problem:

U.S. Pat. No. 5,392,944, Jennings, Feb. 28, 1995 describes a tray, which is positioned below the cooler for the purpose of collecting water which leaks through the corroded cooler base. This patent does not relate to the maintenance of the cooler or the prevention of corrosion. It requires that a cooler be dismounted from a roof for installation and addresses only cooler reservoirs that have already rotted through.

U.S. Pat. No. 4,977,755, Tulley, Dec. 18, 1990 describes a liner for the reservoir of both side and downdraft evaporative coolers which is replaceable and has vertical side walls which are folded up and inserted between the pads and the cooler structure to form a seal. This patent fails to address the most critical aspect of corrosion in evaporative cooler reservoirs; anaerobic corrosion. Anaerobic corrosion becomes present when a fluid such as water is presented onto a ferrous element such as the galvanized sheet metal commonly used to form the reservoir of the majority of evaporative coolers in use today, and there is the absence of free oxygen. The liner described in this patent sits directly onto a cooler's existing reservoir eliminating any possibility of free oxygen to enter. When moisture from leaks or internal sweating occurs, an anaerobic environment is created under said liner that can actually exacerbate the corrosive process. The effect is very similar to that described with the use of submarine cooler emulsion.

U.S. Pat. No. 4,687,604, Goettl, Aug. 18, 1987 describes a cooler water reservoir with channels in the base, which localized the water supply and thus requires less water to operate. The reservoir is integral to the cooler and cannot be removed for cleaning or replaced when it becomes corroded.

U.S. Pat. No. 4,657,709, Goettl, Apr. 14, 1997 describes a water distribution trough design of the reservoir, which relieves the water distribution problems associated with large evaporative coolers. It is directed at large industrial size coolers. The troughs are integral to the cooler.

U.S. Pat. No. 4,369,148, Hawkins, Jan. 18, 1983 describes a supplantary reservoir positioned below the cooler in which are performed the functions of maintaining the water level and feeding the pump which serves to deliver water to the tops of the pads. Water is thus not retained in the cooler base and the problems of cleaning and corrosion are thus diverted to the external reservoir, which is more easily removed and serviced.

Provisional Patent Application No. 60/040,108, Rees/McCabe, Mar. 10, 1997 describes a series of trays which are interconnected by the use of small tubes between the trays which are sealed together by the use of rubber grommets. The trays are placed inside the cooler's reservoir forming a square trough around the edges. They can be cleaned or replaced. The problem of anaerobic corrosion as identified with regard to the invention described in U.S. Pat. No. 4,977,755 is present in this art also. Additionally, the interconnecting joints described between the trays are constantly submerged and given to leaking.

BRIEF SUMMARY OF THE INVENTION:

This invention has several advantages over the cited prior art. The principal features that differentiate said invention from all prior art are:

(a) the molded air channels in its edges, sides and bottom;

(b) the air pressure differential between the inside and outside of the cooler's cabinet is employed to draw air into these channels during operation of said cooler in order to create a flow of drying air between said invention and said cooler's metal reservoir thereby retarding all forms of corrosion but especially addressing anaerobic corrosion. Dryness of said cooler's metal reservoir being the primary objective;

(c) it has a preformed feature which provides a convenient means to manage overflow drainage;

(d) while said invention can be flexed sufficiently to permit easy installation, it is fully preformed and holds a rigid freestanding shape;

(e) it is sufficiently durable to withstand multiple season use, yet inexpensive enough to be discarded and replaced annually.

Said invention will accommodate cooler configurations using 1, 3 or 4 pads. These advantages are in addition to all previous cited art. Further objects and advantages will become apparent from a consideration of the ensuing description and drawings.

REFERENCE NUMERALS IN DRAWINGS

| | |
|---|---|
| 10. Cooler pad | 34. Path of air flow |
| 12. Cooler reservoir | 36. Corrugated sides |
| 14. Drain hole | 38. Male to female glue joint |
| 16. Cooler cabinet | 40. Cut out for cooler duct |
| 18. Side-mounted-reservoir cabinet | 42. Rubber grommet |
| 20. Air flow tabs | 44. Overflow drain pipe |
| 22. Molded in waterpump mount | 46. Drain pipe nut |
| 24. Down draft cooler duct | 48. Exterior threaded drain bib |
| 26. Molded in air channels | 50. Cross-section of cooler reservoir |
| 28. Airflow access port | 52. Disposable reservoir |
| 30. Molded in overflow drain feature | 56. Side draft cooler duct |
| 32. Corner recess | |

DETAILED DESCRIPTION OF THE INVENTION

Figure 1A:
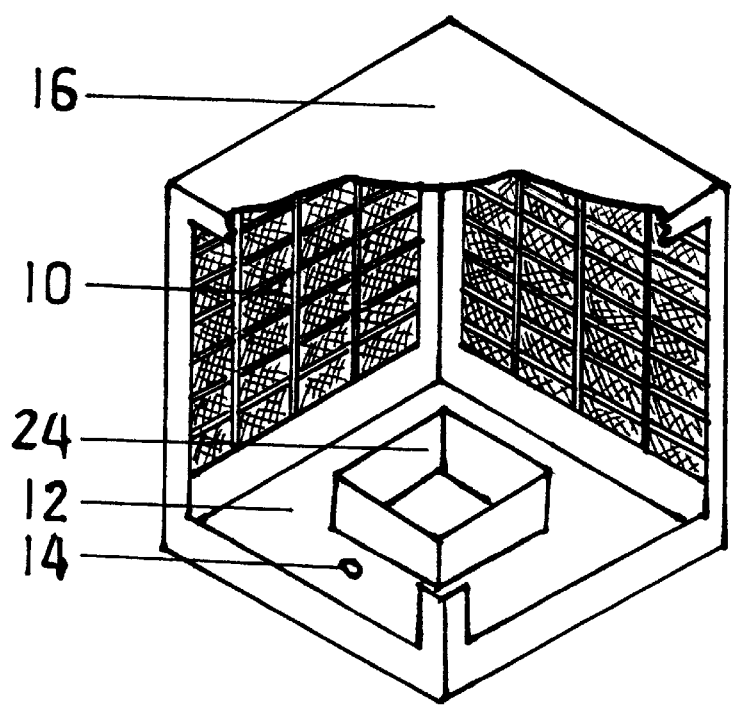
FIG. 1A shows a cut away view of a conventional, 4 pad, down draft evaporative cooler cabinet.
Figure 1B:
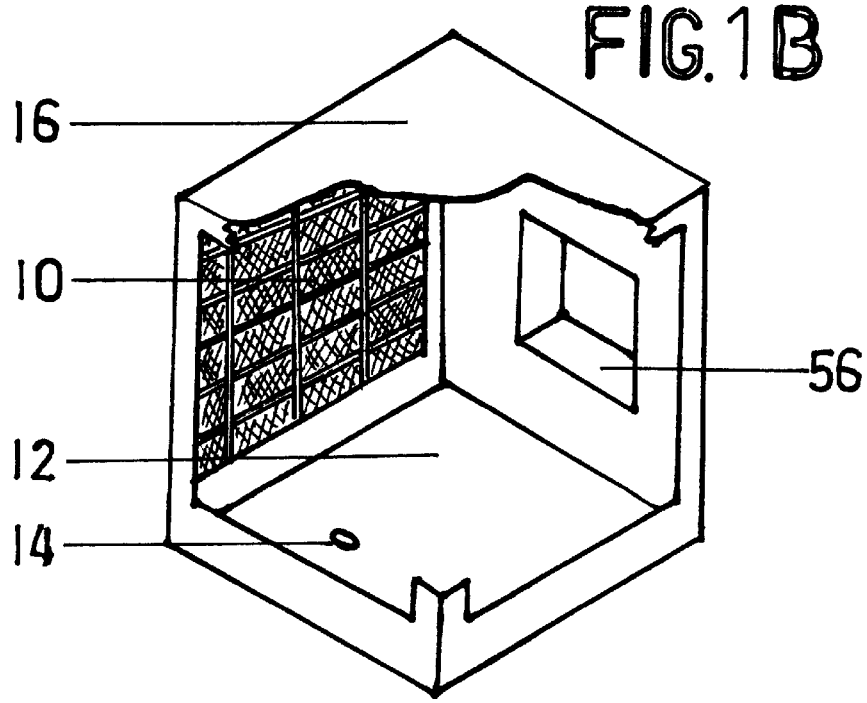
FIG. 1B shows a cut away view of a conventional, 3 pad, side draft evaporative cooler cabinet.
Figure 1C:
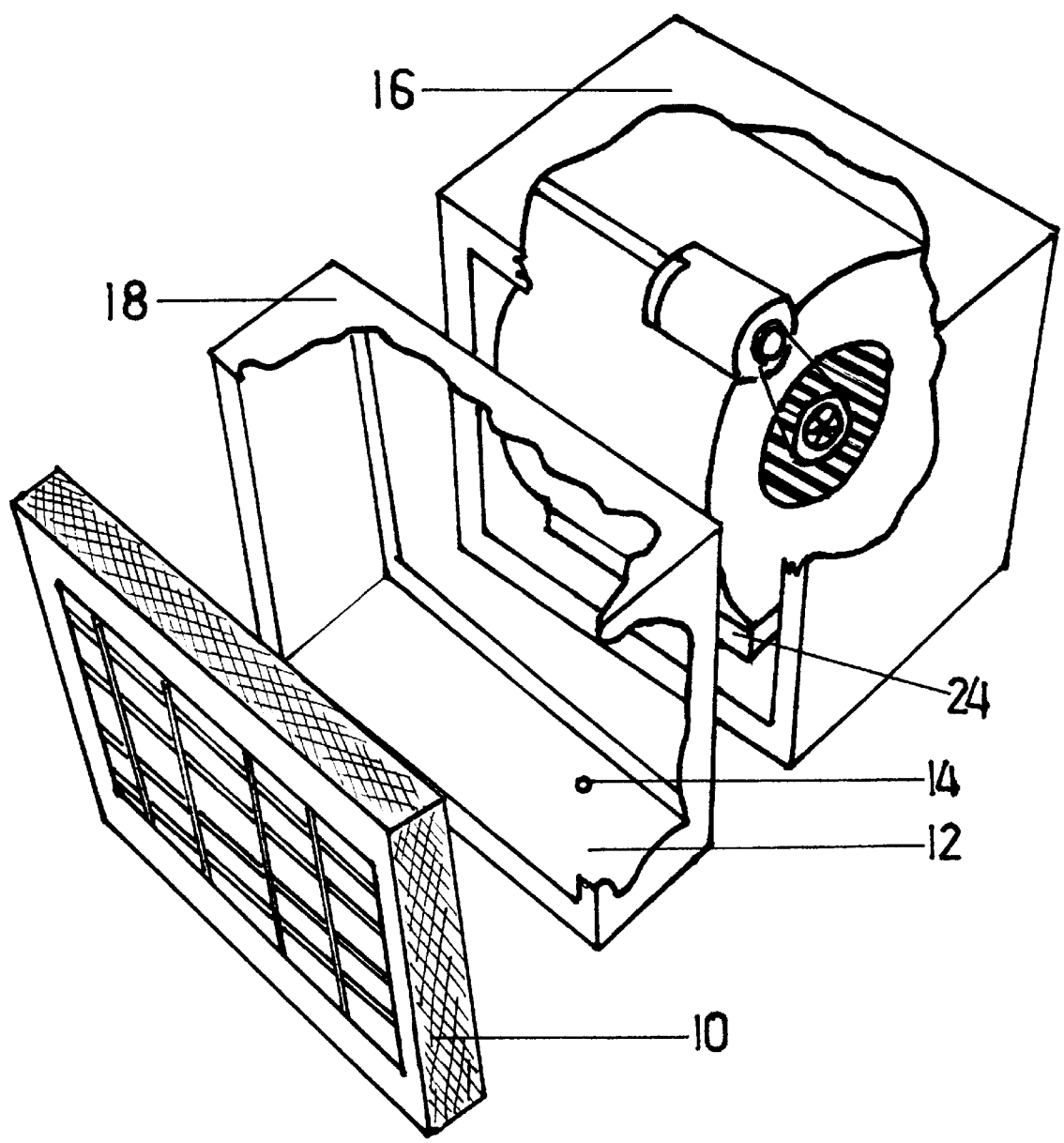
FIG. 1C shows a cut away view of a conventional, 1 pad, side-mounted-reservoir evaporative cooler cabinet.

FIGS. 1A through 1C illustrate cut away views of the three most common evaporative cooler configurations in use today. While these coolers may have some differences in their individual configurations, they all function on the same principal and all three consist of a cabinet 16, cooler pads 10, a ducting system 24 & 56, reservoir 12 and a drain 14.

Figure 2:
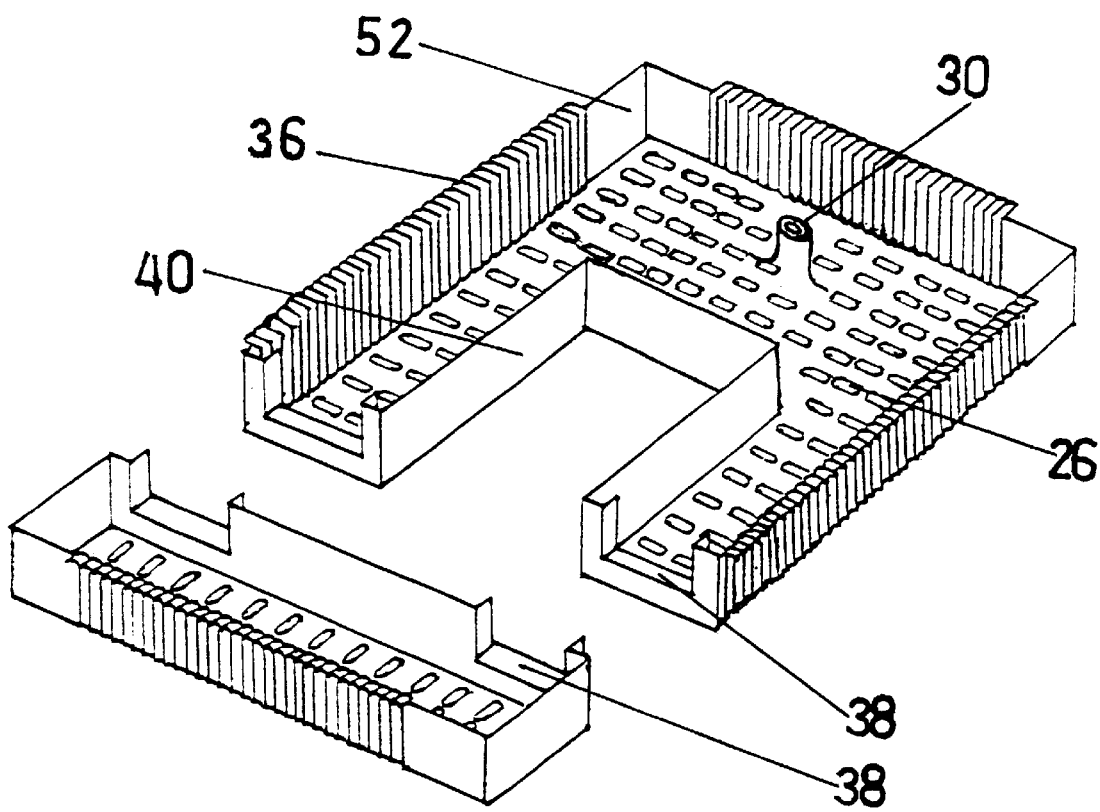
FIG. 2 shows a perspective view of the disposable reservoir in the preferred embodiment to accommodate both conventional, 3 and 4 pad, evaporative coolers.
Figure 2A:
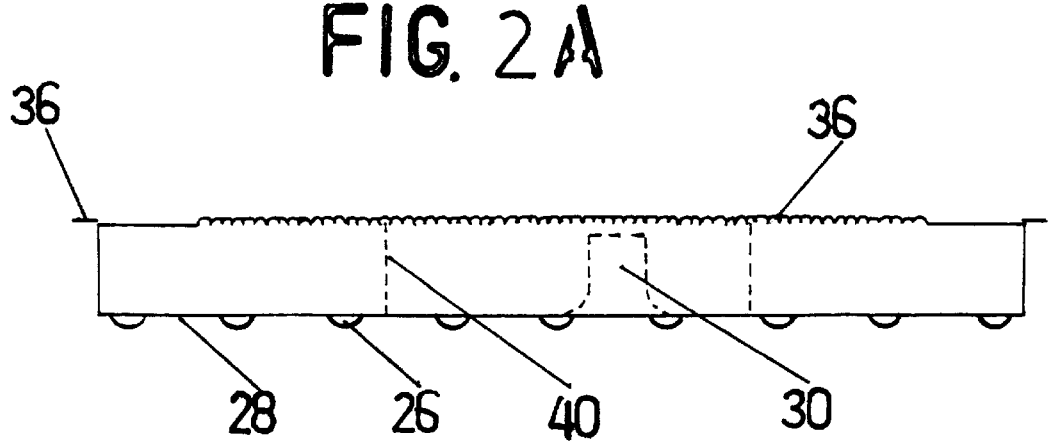
FIG. 2A shows a perspective side view of said disposable reservoir.

FIG. 2 illustrates a typical embodiment of the invention. The disposable reservoir 52 is a tray-like article, which conforms in shape to the cooler's integral reservoir 12. The rigid sides of the cut out 40 for the down draft cooler duct 24 allows the same disposable reservoir 52 to be used with both a down draft cooler FIG. 1A or a side draft cooler FIG. 1B.

A corrugated-like section along each side 36 is equal in dimension to the width of the cooler pad 10. A tab-like section of this corrugation 36 is preformed to fit under the bottom edge of the cooler pad 10 as it is seated into the pad window of the cabinet 16. The thickness of this corrugated tab 36 is sufficiently thin so as not to impair the fit of the cooler pad 10 into its seat in the cooler cabinet 16. The corrugated tab 36 between the bottom of the cooler pad 10 and its seat is, however, thick enough to provide a means for a small air way 34 all along the entire bottom of the cooler pad 10 as detailed in FIG. 5.

Figure 4:
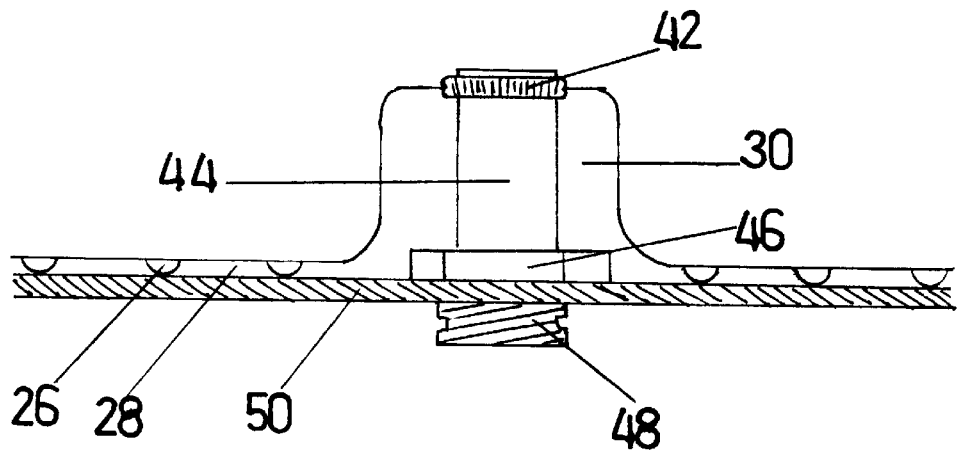
FIG. 4 shows a detailed view of the molded in feature designed to manage overflow drainage.

FIG. 4 illustrates a detail of the molded in overflow drain feature 30. Since the height dimension of overflow drainpipes varies by manufacturer, a replacement drainpipe 44 of the correct height is provided with the invention along with a rubber grommet 42. The cooler's original drainpipe would be removed at installation leaving only the connecting nut 46 in place with the exterior threaded bib 48. The provided drainpipe 44 will work with either a threaded or slip fitting at the drain hole 14. After the disposable reservoir 52 is in place, the supplied drain pipe 44 is introduced through the rubber grommet 42 and extended down and into the throat of the existing drain hole 14. The rubber grommet 42 provides a means to seal around the drain pipe so that in the event of a failure of the float valve, water is not flooded into the air flow access 28 under the disposable reservoir 52. By inserting the cooler's water pump discharge tube into the drain pipe 44, the water can be easily evacuated from the disposable reservoir 52 for easy cleaning or replacement.

Figure 7:
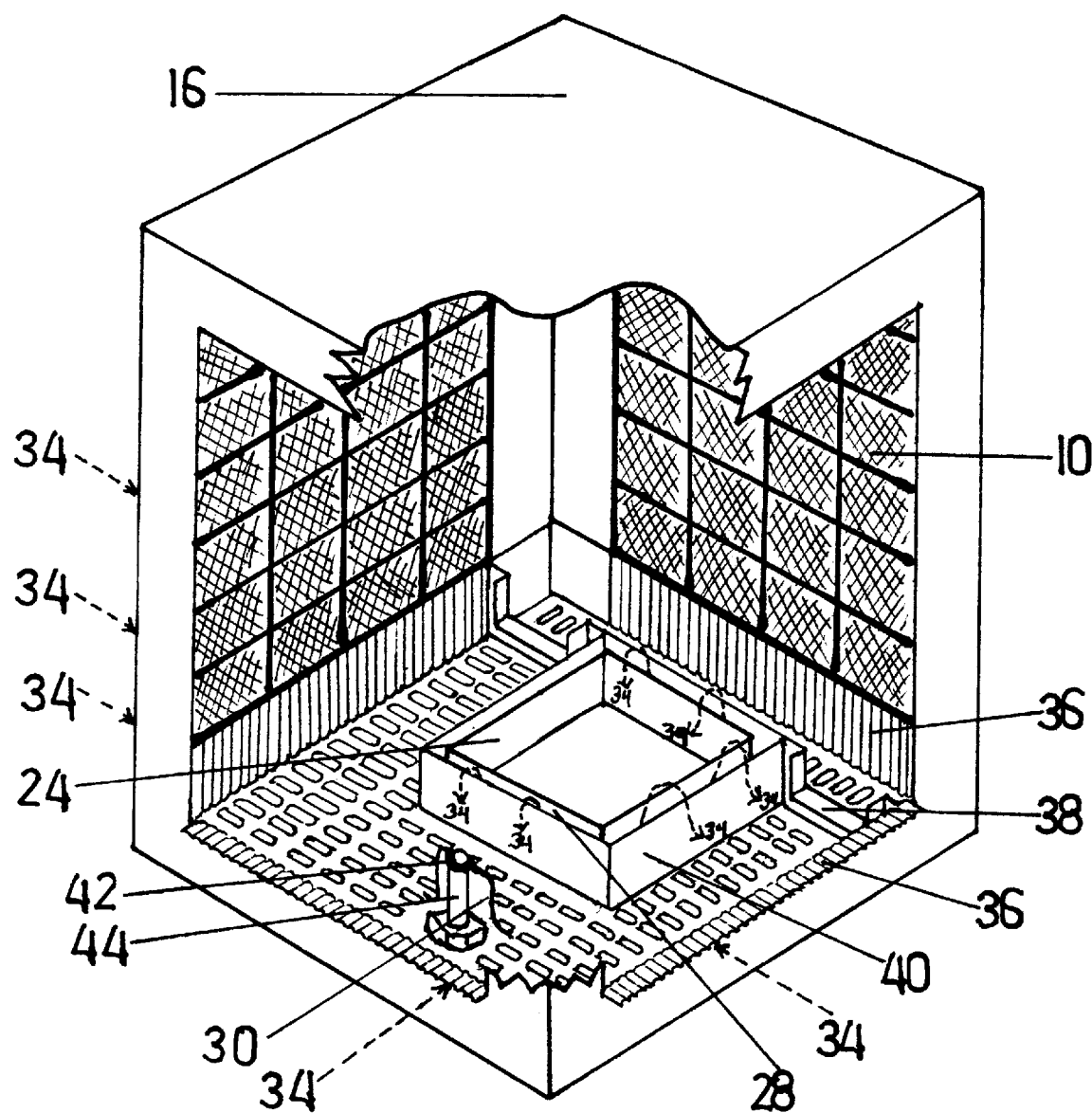
FIG. 7 shows a perspective cut away view of a conventional, 4 pad, down draft evaporative cooler with the disposable reservoir installed.
Figure 8:
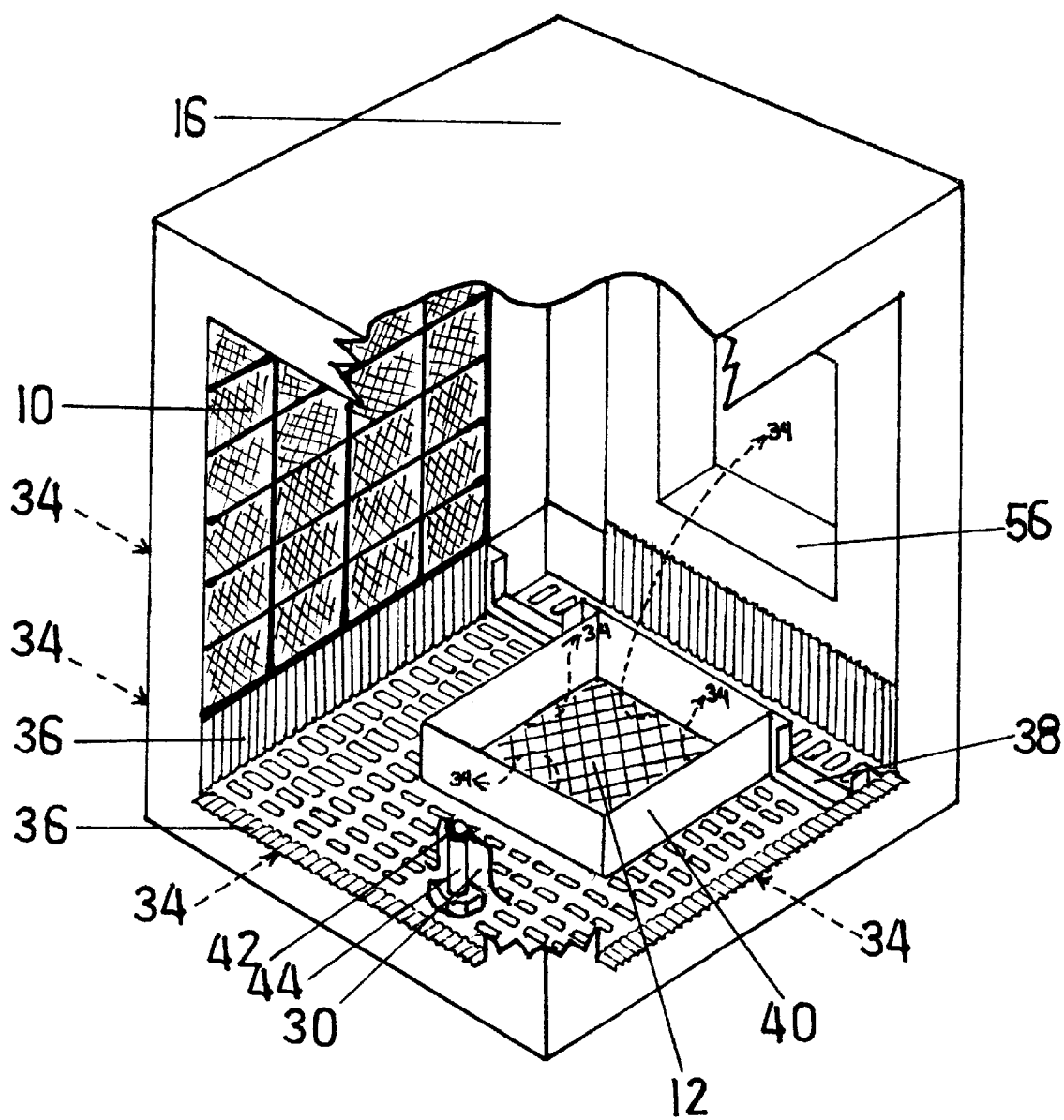
FIG. 8 shows a perspective cut away view of a conventional, 3 pad, side draft evaporative cooler with the disposable reservoir installed.

When an evaporative cooler is activated, an air pressure differential between the inside and outside of the cooler cabinet 16 is created. This pressure differential is what pulls the hot outside air into and through the cooler pad 10 which cools the air by the evaporation process before it is introduced into the ducting system 24 & 56 as illustrated in FIGS. 7 & 8. The invention employs this air pressure differential to pull dry, hot air 34 into the corrugated air way 36 under the cooler pad 10 bottom. The direction of air flow 34 inside the cooler cabinet 16 pulls this dry air through and around the air channels 26 and the air access ports 28, which have been molded into the disposable reservoir 52 as illustrated in FIGS. 7 & 8. This flow of dry air is pre-cooled by the temperature of the water held in the disposable reservoir 52 as it circulates through the air flow access ports 28 and ultimately is mixed with the cooler, evaporated air inside the cooler cabinet 16.

Figure 5:
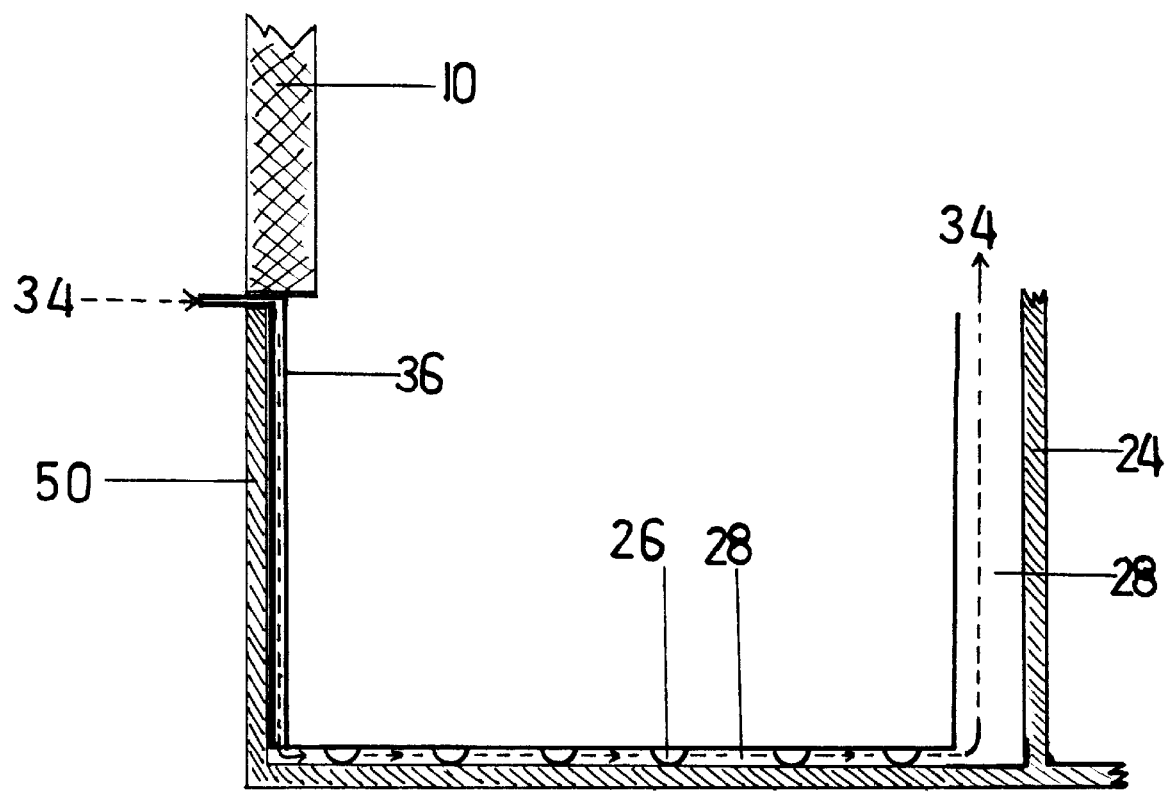
FIG. 5 shows a sectional view of the disposable reservoir as it would seat in a conventional, 3 or 4 pad, evaporative cooler.

As illustrated in FIGS. 4 & 5, the disposable reservoir 52 does not sit directly onto the cooler's reservoir 50. The dry air flow 34 throughout this system of molded in air channels 26 and air flow access ports 28 is the principle means by which the invention achieves its objective of eliminating anaerobic corrosion and which differentiates this invention from all prior art. It is equally important to provide a flow of dry air over the metal cooler reservoir 50 and to supply free oxygen molecules to all areas where moisture from any source might become present.

A means of easy installation is provided by a male to female glue joint 38. Ordinary PVC cement which is inexpensive and in abundant supply is applied to this joint 38 at installation and provides for a water tight seal in the disposable reservoir 52. In the case of a side draft cooler FIG.

1B, this glue joint 38 could actually be made prior to installation. This embodiment will, therefore, accommodate both a down draft cooler cabinet FIG. 1A, and a side draft cooler cabinet FIG. 1B.

Figure 3:
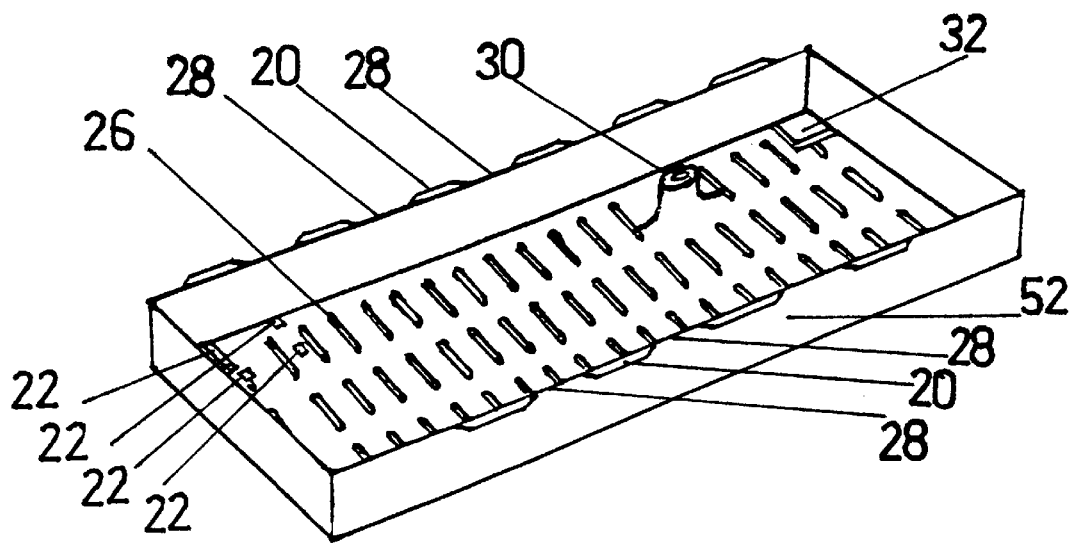
FIG. 3 shows a perspective view of the disposable reservoir in an alternate embodiment to accommodate a conventional, 1 pad, side-mounted-reservoir evaporative cooler.
Figure 3A:
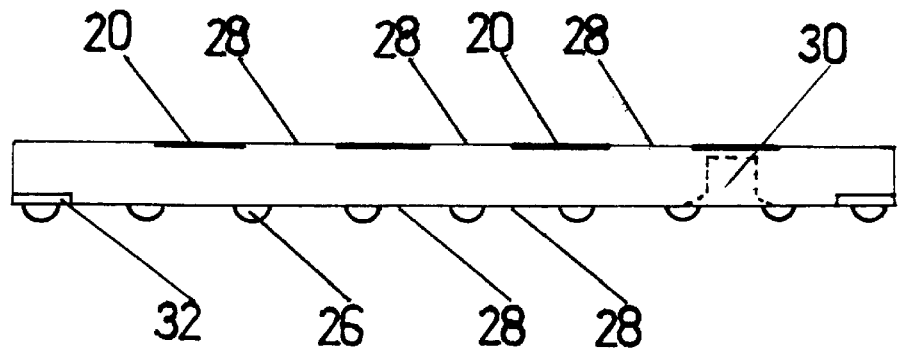
FIG. 3A shows a perspective side view of said disposable reservoir.
Figure 6:
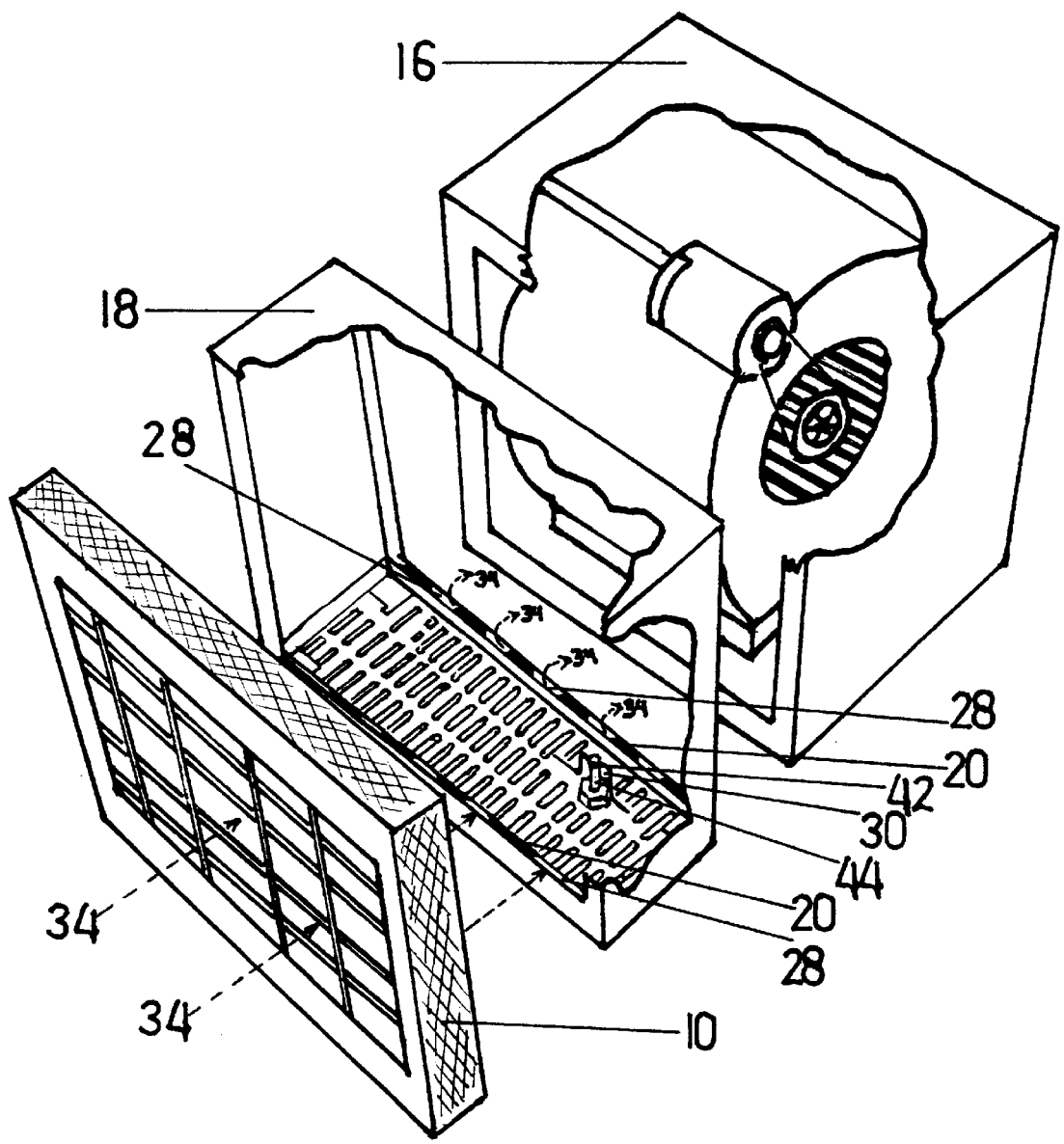
FIG. 6 shows a perspective cut away view of the disposable reservoir installed in a conventional. 1 pad, side-mounted-reservoir evaporative cooler.

This description is of the preferred embodiment, but the principle of the invention may be fulfilled equally by the embodiment illustrated in FIG. 3 and demonstrated in FIG. 6. You will observe that even in this embodiment, all components are exactly as illustrated in the preferred embodiment. Only minor configuration differences are required. For example, instead of a corrugated side to provide an air flow access, FIGS. 3 & 3A illustrate how I have substituted air flow tabs 20 to create the same desired flow of dry, hot air under the disposable reservoir 52. In this embodiment, a waterpump mount 22 has been molded in. And in each of the four corners a recess 32 has been molded in to provide for large deposits of resin, which can sometimes be present in this particular cooler design. FIG. 6 illustrates that this embodiment functions exactly as the preferred embodiment illustrated in FIGS. 7 & 8. Market interest will determine whether there will be a demand for other than the preferred embodiments.

The disposable reservoir 52 would be preferably pressure or vacuum formed from thermoplastic material, e.g., polyvinyl chloride, but could be satisfactorily fashioned by injection molding of styrene or ABS, or drawn of aluminum, or formed of polypropylene, polyethylene, polycarbonate, nylon or rubber, or other similar materials, depending upon the economies of scale and tooling costs. The disposable reservoir 52 would be manufactured in a variety of sizes that would accommodate the majority of evaporative coolers in use today.

Although the description above contains many specificity's. These should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A disposable reservoir for an evaporative cooler, said reservoir comprising:

a tray having a bottom wall, said tray having a middle, said bottom wall surrounded by an upstanding sidewall, said upstanding sidewall having a top and a bottom, said upstanding sidewall on at least two portions thereof opposing each other across said middle having a plurality of projections, said projections having airflow passages therebetween, said projections being on an exterior of said upstanding sidewall, whereby said air flow passages allow air to flow between the top and the bottom of the opposing sidewall portions along said exterior when said tray is placed in an evaporative cooler, said tray having a plurality of projections on the bottom wall with air flow passages therebetween, said tray having an upstanding drain spaced inwardly from the surrounding sidewall, said drain having an opening spaced above the bottom wall.

2. The disposable reservoir of claim 1, wherein said tray is generally rectangular in shape.

3. The disposable reservoir of claim 1 or 2, wherein said tray is segmented.

4. The disposable reservoir of claim 1, wherein said tray has an opening through the bottom wall, said opening being spaced inwardly from said upstanding sidewall, said opening being surrounded by a second upstanding sidewall, said upstanding sidewall spaced inwardly from the first mentioned said upstanding sidewall.

* * * * *